3,131,067
METHOD OF WASHING EGGS

John A. Garibaldi, El Cerrito, and Henry G. Bayne, Berkeley, Calif., assignors to the United States of America as represented by the Secretary of Agriculture
No Drawing. Filed Oct. 17, 1961, Ser. No. 145,784
4 Claims. (Cl. 99—113)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of a novel procedure for washing eggs which results in reduced contamination and spoilage of the washed eggs. Further objects and advantages of the invention will be evident from the following description wherein parts and percentages are by weight unless otherwise specified. The unqualified term "eggs" is herein employed to mean eggs in the shell. The abbreviation "p.p.m." means parts per million.

In preparing eggs for the market it is general practice to wash them. Originally, washing was applied only to dirty eggs but with the introduction of egg-washing machines the trend has been toward washing all eggs because it takes less time to do so than to separate the clean from the dirty eggs.

It is recognized in the art that washing increases the risk of spoilage because the wash-water acts as a medium which may carry fecal matter, dirt, etc., into the eggs. It is understood in the industry that the egg-washing machine must be thoroughly cleaned at frequent intervals and periodically supplied with fresh water to avoid spreading contaminating material from dirty eggs to the cleaner ones. Thus, in general, it is known that sanitary measures are highly important in reducing spoilage of the washed product.

We have found that good sanitary practice is not the complete answer to the problem. Thus we have discovered another key factor which has not previously been recognized. Our investigations have shown that the presence of iron in the wash-water is a critical item. In particular, iron in the wash-water exerts a deleterious influence as it enhances spoilage of the washed eggs. Thus in controlled tests under otherwise identical conditions, using (a) water essentially free from iron and (b) water containing an amount of iron (5 to 10 p.p.m.) as commonly found in ordinary water supply systems, the products washed with iron-free water displayed a substantially smaller proportion of spoiled eggs than did those washed with water containing iron. The reason for this critical effect of iron is not understood but this does not belie the practical implications of our discovery.

The deleterious effect of iron is particularly demonstrated by the following experiment wherein fresh eggs were contacted with bacterial suspensions, with and without added iron, then stored and the egg meats tested for bacterial spoilage.

The bacteria used in this experiment were those known to be implicated in egg spoilage and most of them were actually isolated from spoiled egg specimens.

The eggs used were nest-clean, unwashed, farm fresh eggs, laid by hens 9 to 12 months old. They were collected on day of lay and subjected to experimental contamination after storage at 35° C. for 18 hours.

The eggs were infected as follows: One dozen warm (35° C.) eggs were immersed for 15 minutes in two liters of a cold (5° C.) suspension containing approximately $10^7$ bacteria per ml. in distilled water. The eggs were then air dried at room temperature and then stored at 20° C. Eggs were subjected to infection both in the presence and absence of added iron. Iron (10 p.p.m., supplied by ferrous sulphate) was added to the bacterial suspension immediately prior to the immersion of the eggs. Eggs, as controls, were similarly treated in sterile, distilled water with and without added iron.

After a storage period of from 21 to 25 days at 20° C., the eggs were examined for the development of rots. The eggs were broken under aseptic conditions and the egg meats dropped into a sterile blender containing 120 ml. of sterile 0.1% tryptone solution. After homogenization, bacterial populations of the egg meats were determined by spread plating 0.1 ml. of the appropriate dilution onto trypticase soy agar plates.

The results are tabulated below.

TABLE 1
*The Effect of Iron on the Bacterial Spoilage of Eggs*

| Bacterium applied to eggs | Number of eggs spoiled (of 12) | |
|---|---|---|
| | Without added iron | With 10 p.p.m. iron |
| Proteus vulgaris (5 strains) | 0 | 12 |
| Paracolobactrum intermedium (2 strains) | 0 | 12 |
| Achromobacter liquifaciens (2 strains) | 0 | 9 |
| Salmonella typhimurium TM-1 | 0 | 12 |
| Salmonella pullorum 1431 | 0 | 10 |
| Pseudomonas fluorescens 7 | 6 | 12 |
| Aerobacter cloacae 24a | 4 | 12 |
| Alcaligenes bookeri 29d | 6 | 11 |
| Paracolobactrum intermedium 56a | 9 | 12 |
| Controls (sterile water) | 0 | 2 |

In applying the invention in practice, eggs are washed in the conventional manner with the exception that the water supplied to the system should have a low iron content and should preferably be essentially free from iron. For best results the water should be completely free from iron. However, this goal may be difficult to attain with the available water supply and equipment to purify it. Since any reduction of iron content of the water will effect an improvement in the quality of the washed eggs, it is within the broad purview of the invention to employ any water of reduced iron content, preferably one containing less than 1 p.p.m. of iron. Methods are available for reducing the iron content of water supplies and no claim is made to novelty in this regard. For purposes of illustration, mention may be made of systems utilizing cation exchange, precipitation with suitable chemicals, or aeration to oxidize the iron to the ferric state, followed by filtration or decantation to separate the insoluble ferric hydroxide. As in conventional practice, good sanitary measures including frequent cleaning of the washing machine, frequent renewal of the wash liquor, addition of germicides and/or detergents, etc. are continued in applying the process of the invention.

The invention is further demonstrated by the following illustrative examples.

The egg-washing machine used in these runs was a commercial type wherein the eggs are rotated against fixed brushes by a hard, rubber roller. The rotating eggs are sprayed continuously with water from a reservoir maintained at 50° C.±2° C. The wash-water is recirculated. To prevent buildup of bacteria in the wash-water, a commercial chlorinated detergent is added periodically to keep the available chlorine content in the water at about 30 p.p.m. After washing the eggs are carried by a belt through a hot air tunnel where they are quickly dried.

EXAMPLE I (1) A batch of eggs was washed in the machine supplied with well-water containing 0.4 p.p.m. of iron. Two cases (720 eggs) of the washed product were removed from the line for testing. (2) The wash-water supplied to the system was then deliberately treated to increase its iron content to 10 p.p.m. (by addition of $FeSO_4$). The machine was operated under this condition and two cases of washed eggs removed from the line for testing.

The two batches of washed eggs were stored at 13° C. for 48 days. The eggs were then candled under ultraviolet light to detect fluorescent albumens. This is a well-known test responsive to the presence of Pseudomonas organisms, a common egg-spoilage ("green-rot") bacterium.

The results are tabulated below.

| Run | Fe in wash-water, p.p.m. | Fluorescent albumens | |
|---|---|---|---|
| | | No. (of 720) | Percent |
| 1 | 0.4 | 6 | 0.8 |
| 2 | 10.0 | 18 | 2.5 |

EXAMPLE II

In one run eggs were washed in the machine using city water containing 0.2 p.p.m. of iron. In the second run eggs were washed in the machine using a local well-water containing 4.8 p.p.m. of iron.

The two batches of eggs (2 cases each) were stored 48 days at 13° C., then tested as described in Example I.

The results are tabulated below.

| Run | Fe in wash-water, p.p.m. | Fluorescent albumens | |
|---|---|---|---|
| | | No. (of 720) | Percent |
| 1 | 0.2 | 6 | 0.8 |
| 2 | 4.8 | 45 | 6.2 |

Having thus described the invention, what is claimed is:

1. A process for effectively utilizing iron-containing water for washing eggs which comprises (1) removing iron from said iron-containing water while retaining the water in the liquid phase and (2) washing eggs with the so-treated water, whereby to reduce spoilage of the washed eggs.

2. A process for effectively utilizing iron-containing water for washing eggs which comprises (1) removing iron from said iron-containing water by subjecting it to cation exchange and (2) washing eggs with the so-treated water, whereby to reduce spoilage of the washed eggs.

3. A process for effectively utilizing iron-containing water for washing eggs which comprises (1) removing iron from said iron-containing water by precipitating the iron therefrom and (2) washing eggs with the so-treated water, whereby to reduce spoilage of the washed eggs.

4. A process for effectively utilizing iron-containing water for washing eggs which comprises (1) removing iron from said iron-containing water by aeration to oxidize the iron to the ferric state, followed by filtration to separate soluble ferric hydroxide and (2) washing eggs with the so-treated water, whereby to reduce spoilage of the washed eggs.

References Cited in the file of this patent

UNITED STATES PATENTS

| 1,276,659 | Jensen | Aug. 20, 1918 |
| 2,576,236 | Paden | Nov. 27, 1951 |
| 2,633,437 | Detjen | Mar. 31, 1953 |

OTHER REFERENCES

Bryant: "Effect of Washing on the Keeping Quality of Hens' Eggs," Journal of Agricultural Research, vol. 48, No. 1, pp. 67–80 (only p. 70 relied on), January 1, 1934, 99–113. (Copy in Div. 63.)